United States Patent
Jacobs

[15] 3,702,073
[45] Nov. 7, 1972

[54] ACCELEROMETER
[72] Inventor: Earl D. Jacobs, Tustin, Calif.
[73] Assignee: Sundstrand Data Control, Inc.
[22] Filed: Feb. 28, 1969
[21] Appl. No.: 803,208

[52] U.S. Cl. ................................................73/517
[51] Int. Cl. .............................................G01p 15/08
[58] Field of Search........73/516, 517, 71.2, 514, 515

[56] References Cited

UNITED STATES PATENTS

| | | | |
|---|---|---|---|
| 3,513,711 | 5/1970 | Rogall et al. | 73/517 |
| 2,411,401 | 11/1946 | Welch | 73/517 X |
| 2,616,681 | 11/1952 | Morrow | 73/505 |
| 3,229,530 | 1/1966 | Wilcox et al. | 73/517 R |
| 3,339,419 | 9/1967 | Wilcox | 73/517 R |
| 3,417,626 | 12/1968 | Riordan | 73/516 |

*Primary Examiner*—James J. Gill
*Attorney*—Reed C. Lawlor

[57] ABSTRACT

An accelerometer is provided for detecting acceleration which employs a flapper ring clamped at raised points between upper and lower portions of a magnet structure. The flapper is suspended by a bifilar hinge on the ring between two permanent magnets. Coils are mounted on opposite sides of the flapper, each encircling one of the permanent magnets and separated therefrom by an air gap. Each side of the flapper has a metallic coating thereby forming a capacitor with an inner face of the magnet structure on each side of the flapper. As the accelerometer is accelerated, the flapper is displaced relative to the magnet structure thus increasing the capacitance of one capacitor and decreasing the capacitance of the other capacitor. Electrical signals proportional to the change in the capacitances, and therefore proportional to the acceleration, are fed through a servo loop to the coil which set up a magnetic field which interacts with the magnetic fields of the permanent magnets to oppose the displacement of the flapper.

8 Claims, 6 Drawing Figures

PATENTED NOV 7 1972

INVENTOR
EARL D. JACOBS
BY
Reed C. Lawlor
ATTORNEY

INVENTOR
EARL D. JACOBS
BY
Reed C. Lawlor
ATTORNEY

ACCELEROMETER

CROSS REFERENCES TO RELATED APPLICATIONS

My invention relates to improvements in accelerometers and more particularly to improvements in accelerometers of the Eyestone-Wilcox type. Accelerometers of this type were disclosed by Eyestone in U.S. Pat. No. 2,995,935 and by Wilcox in U.S. Pat. No. 3,339,419.

PRIOR ART

Accelerometers of the type in question employ a magnet unit that is secured to a case or housing and also employ a flapper that is flexurally mounted relative to the case. The case, and hence the magnet unit, is normally rigidly attached to an object whose acceleration is to be detected or measured. In the usual practice, the magnet unit comprises two magnet structures, one on each side of the flapper and the flapper is composed of fused quartz. Coils are mounted on the flapper in positions where they encircle a pair of permanent magnets which form part of the magnet unit and which are mounted on opposite sides of the flapper. The coils and the flapper together constitute a proof mass. As the object is accelerated, either in a single direction or in an oscillatory manner, the quartz flapper tends to remain stationary in space, thus moving relative to the magnet unit.

Capacitor plates in the form of metallic coatings are located on opposite faces of the flapper. These coatings are located opposite metallic surfaces of the magnet unit. These surfaces act as capacitor plates. As a result, two capacitors are formed one on each side of the flapper. As the magnet unit moves relative to the proof-mass, the capacitance of one of the capacitors increases and the capacitance of the other capacitor decreases. These capacitors are employed in connection with a balanced circuit to produce a carrier signal that is modulated in accordance with the magnitude of the acceleration. Preferably the carrier is suppressed.

The modulated electrical signal is demodulated, as by means of a ring demodulator, to produce a DC current proportional to the amplitude of modulation and hence proportional to the acceleration. This DC current is amplified and then fed to the coils of the accelerometer to produce a magnetic field which interacts with the field provided by the magnet structure to produce a force which acts on the flapper in such a direction as to counteract the tendency of the capacitances to change in value. This sort of action is sometimes known as feedback or servo. The magnitude of the DC current is proportional to the acceleration, over a wide frequency range extending from 0 cps to a much higher frequency depending on the characteristics of the accelerometer and the circuit in which it is connected.

GENERAL DESCRIPTION OF THE INVENTION

My invention is particularly related to improvements in the structure of the proof-mass and in the arrangement for mounting the proof-mass relative to the magnet structure and case. As a result of the improvements that I have made, an accelerometer of the Eyestone-Wilcox type is provided which is less subject to drift, which is more sensitive, which is less temperature sensitive, and which is more accurate and reliable in operation than accelerometers of the Eyestone-Wilcox type which have been heretofore provided.

Features of my invention that make possible the attainment of these and other advantages include, among others, the following:

1. One of these features involves the employment of a flapper connected by a flexure to a mounting ring composed of the same material namely, fused quartz wherein the flexure has a thickness which is reduced compared with the effective thickness of the mounting ring.
2. Another feature resides in the employment of three or more posts or pillars on each side of the mounting ring to provide a three-point suspension on each side of the mounting ring.
3. Another feature resides in the employment of a malleable material, such as gold, on the faces of the posts to minimize effects of irregularities of the metal faces against which the posts are pressed in mounting.
4. Another feature resides in the employment of a flexure which is apertured to provide spaced flexure arms to provide mechanical stability and to minimize effects of microscopic warpage.
5. According to still another feature the flapper, the mounting ring, and the posts form a unitary structure, that is composed of fused quartz.

These and other features of my invention will be described in more detail hereinafter with reference to one embodiment of the invention taken in conjunction with the accompanying drawings wherein.

DETAILED DESCRIPTION OF INVENTION

Figure 1:
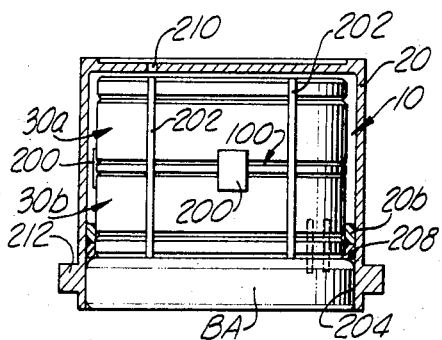
FIG. 1 is a partly sectional side elevational view of the accelerometer.
Figure 2:
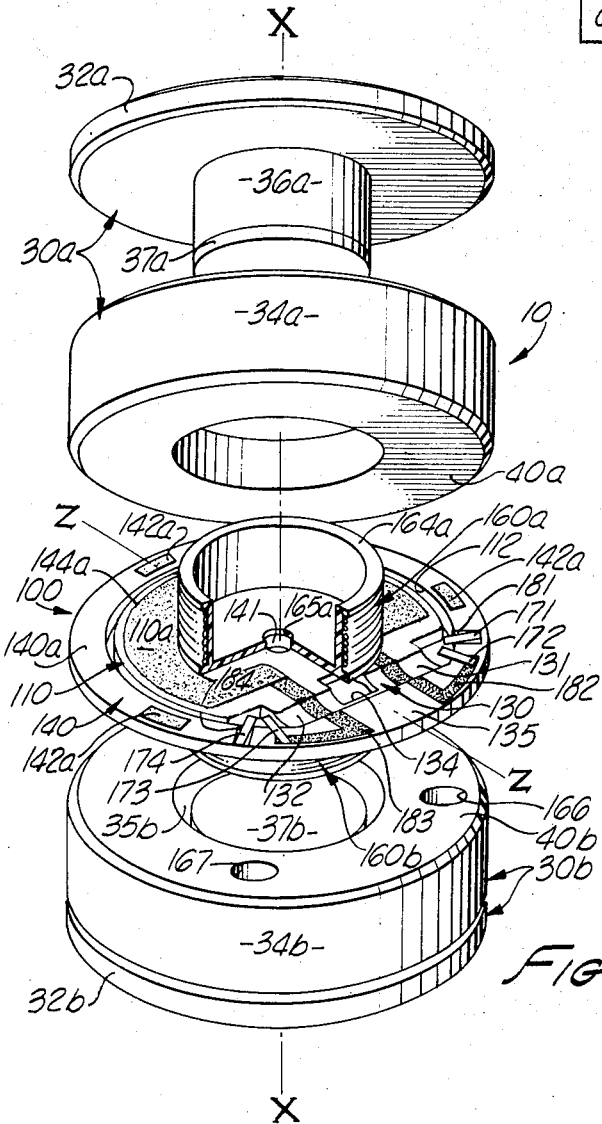
FIG. 2 is an exploded view showing parts of the accelerometer unit.
Figure 3:
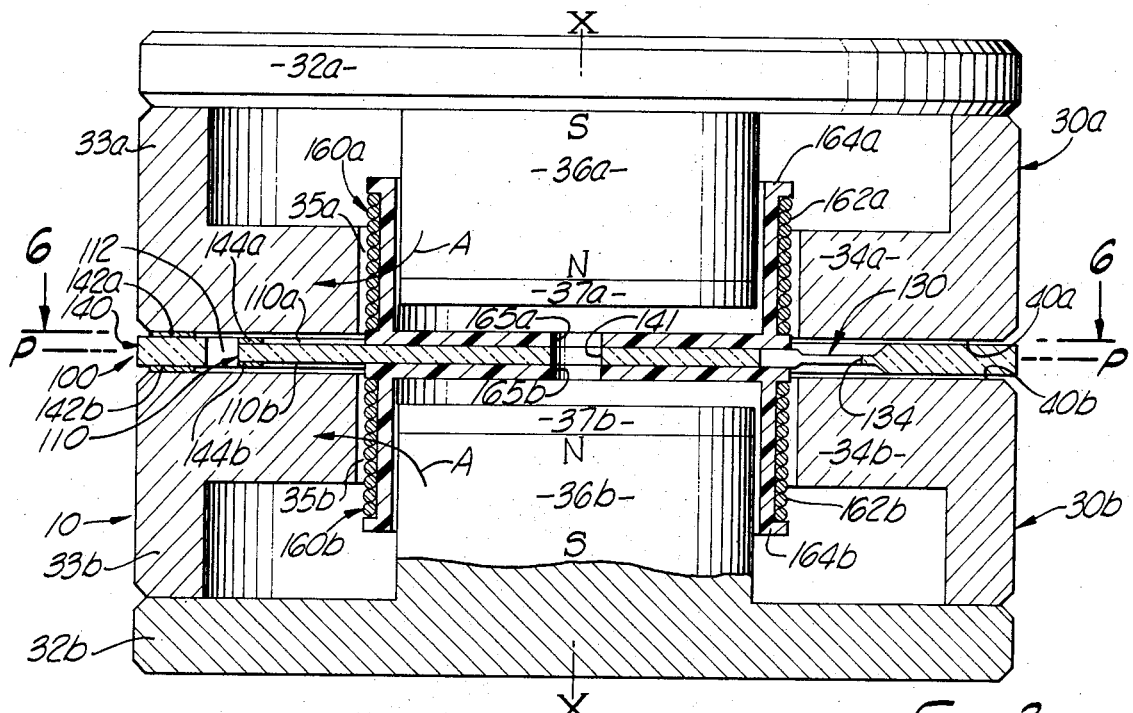
FIG. 3 is a cross-sectional view of the accelerometer unit.
Figure 6:
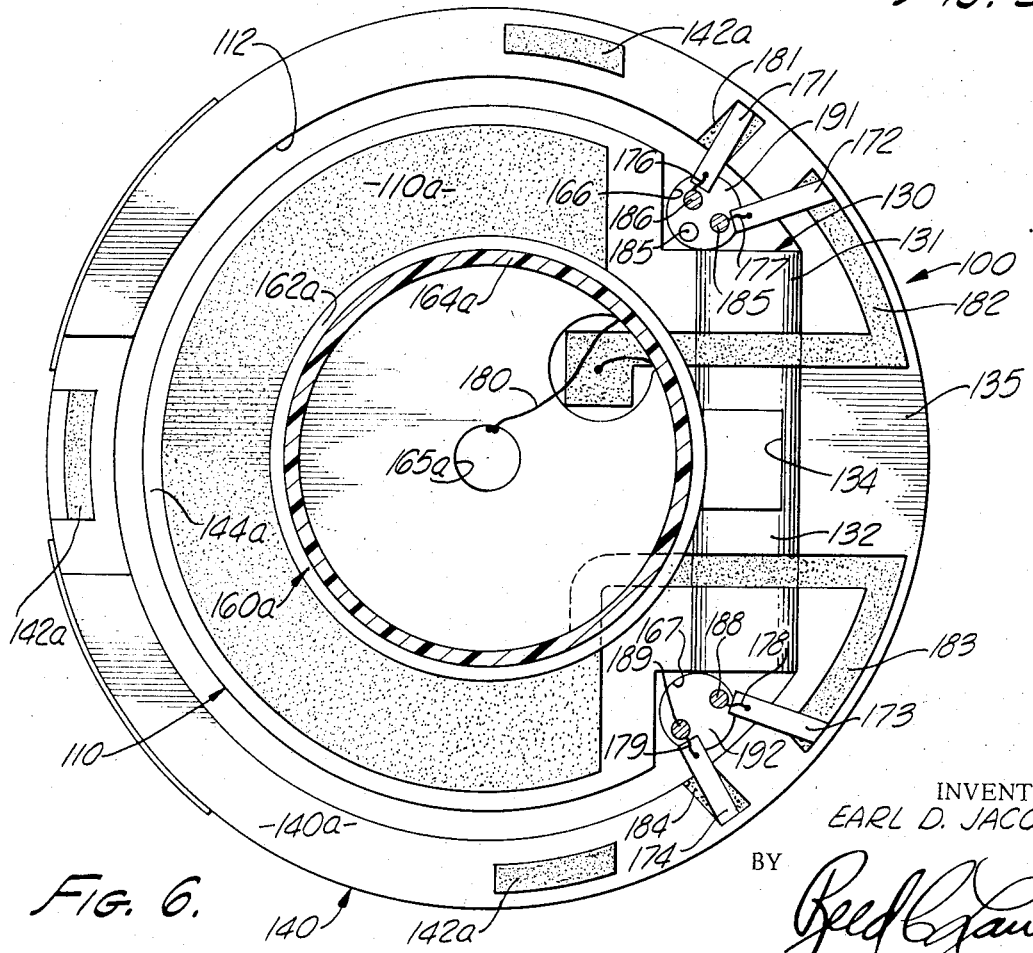
FIG. 6 is a horizontal sectional view as taken on the line 6—6 of FIG. 3.

The accelerometer of this invention comprises an accelerometer unit 10 rigidly supported within a case or housing 20 as indicated in FIG. 1. As illustrated in FIGS. 2 and 3 the accelerometer unit 10 is provided with a magnet structure that comprises two parts, an upper magnet structure 30a, a lower magnetic structure 30b, and is also provided with an intermediate proof-mass structure 100. The magnet structures 30a and 30b are sometimes referred to as stator elements since they are usually firmly secured to the object undergoing test and the flapper is sometimes referred to as a rotor since it rotates (in an oscillatory manner) about the hinge axis of a flexure.

Except as specifically described hereinafter the three structures mentioned above are of circular cylindrical configuration. The axes of the three structures coincide with the central or principal axis X—X which is parallel to the direction of the acceleration to be detected.

The two magnetic structures are formed by end plates 32a and 32b, two permanent magnets 36a and 36b, and pole pieces 34a and 34b. Cylindrical body members 33a and 33b complete the magnetic circuits between the end plates 32a and 32b and the flux return rings or pole pieces 34a and 34b respectively. The body members 33a and 33b and the pole pieces 34a and 34b respectively are formed from one piece of soft magnetic iron, the pole pieces being in the shape of inwardly directed flanges. Each of the pole pieces 34a and 34b has a central circular aperture that encircles the north-pole end of the corresponding permanent magnet 36a and 36b, forming a narrow annular gap 35a and 35b therebetween. As a result, magnetic flux extends radially across each of the gaps as indicated by the arrows A. Circular discs 37a and 37b consisting of magnetically soft iron are cemented or otherwise secured to the facing ends of the magnets 36a and 36b to provide temperature stability to the strength of the magnetic field A. The temperature coefficient of magnetic permeability of these discs and the dimensions of these discs are so proportioned relative to those of the magnetic structure as to stabilize the strength of the magnetic field so that the magnitude of the voltages induced in the coils 160a and 160b when they are moved relative to the magnet structures are independent of temperature. The end plates 32a and 32b and the pole pieces 34a and 34b are composed of a magnetic material having a high permeability and low coefficient of thermal expansion, such as Invar. In practice, the Invar is heat treated to establish its coefficient of thermal expansion at about one part per million per °F thus providing a close thermal match with the quartz.

The proof-mass assembly 100 comprises a flapper or reed 110 hingedly supported by a flexure 130 that extends radially inwardly from a support ring 140. Three posts 142a, spaced about 120° apart on the ring 140, project upwardly from the upper surface 140a of the support ring 140. Likewise, three posts 142b, spaced about 120° apart on the ring 140, project downwardly from the lower surface 140b of the support ring 140. The upper posts 142a are disposed axially opposite the lower posts 142b. Posts 142a and 142b are located at a position along the axis Z—Z of symmetry of the flexure 130 and the flapper 110 diametrically opposite the center of the flexure 130. The remaining posts are located in opposite pairs about 120° from the position of posts 142a and 142b. The spacer posts are thus distributed about the support ring so that the support ring is held rigidly in place and does not flex significantly during acceleration. Such rigidity may be increased if desired by locating one of the posts at the root 135 of the flexure. The posts have cross-sections in a plane parallel to the neutral plane of the flapper structure which are very small compared with the area of the support ring. The angles subtended by the posts at the center of the flapper structure are very small compared with 360°, being about 5° to 15° each and their annular width is less than their angular length.

The flapper 110 is of circular configuration except for parts adjacent the hinge or flexure structure 130 and is spaced from the circular support ring 140 by a narrow annular or arcuate gap 112. The flapper 110 is of the same thickness as the main body of the ring 140. When the ring 140 is in a vertical plane the flapper 110 hangs pendulously downwardly. In this position the surfaces 110a and 110b of the flapper 110 are coplanar with the upper and lower surfaces 140a and 140b respectively of the main body of the ring 140. The posts 142a and 142b protrude outwardly from the planes of these surfaces. As indicated in FIG. 3, the proof-mass structure 100 is symmetrical about a mid-plane P—P that is perpendicular to the central axis X—X when the flapper 110 is in its central or neutral position.

The proof-mass structure 100 is mounted between the opposed faces of the upper and lower magnet structures 30a and 30b with the posts 142a engaging the outer portion of the lower surface 40a of the upper magnet structure 30a and with the posts 142b engaging the outer portion of the upper surface 40b of the lower magnet structure 30b. The distance between the surfaces 40a and 40b equals the effective thickness of the mounting ring. The surfaces 40a and 40b are flat. Thus, the posts 142a and 142b establish narrow gaps between the upper surface 110a of the flapper and the lower surface 40a of the upper magnet structure 30a. Likewise, the posts 142b establish a narrow gap between the lower surface 110b of the flapper and the upper surface 40b of the lower magnet structure 30b.

The hinge or flexure 130 is apertured, forming a bifilar flexure. This flexure comprises a pair of flexure arms 131 and 132 spaced apart by a rectangular opening or window 134, the arms being on opposite sides of the axis Z—Z of symmetry. By employing a multiple arm flexure, twisting of the flapper about the axis Z—Z of the flexure and other warpage that might occur in the flexure is reduced.

Figure 4:
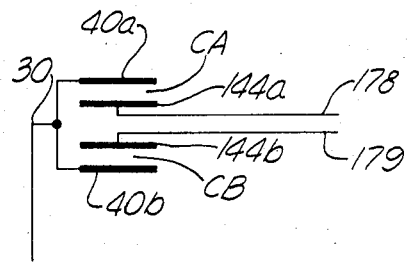
FIG. 4 is an explanatory diagram of electrical aspects of the accelerometer unit.

An arcuate electrode 144a is located on the upper surface 110a of the flapper opposite the lowermost surface 40a of the magnet structure. Similarly, an arcuate electrode 144b is located on the lower surface 110b of the flapper opposite the uppermost surface 40b of the magnet structure. These electrodes and surfaces act as capacitor plates. As indicated in FIG. 4, the upper electrode 144a together with the lower surface 40a of the upper magnet structure, forms a variable capacitor CA and lower electrode 144b together with the upper surface 40b of the lower magnet structure forms a variable capacitor CB. The various parts are so mounted and proportioned that the two capacitors have equal values of capacitance when the flapper is in its neutral position.

Two torquer coils 160a and 160b are securely fastened to the upper and lower surfaces 110a and 110b of the flapper respectively. The two coils are in the form of windings 162a and 162b wound on bobbins 164a and 164b that are cemented to the upper and lower surfaces 110a and 110b of the flapper 110. The two coils 160a and 160b are concentrically located within the gaps 35a and 35b of the upper and lower magnet structures 30a and 30b.

Four electrical terminals 171, 172, 173 and 174 are provided on the support ring 140. Two of these terminals 171 and 172 are connected by conductor strips 181 and 182 to one end of each of the respective coils 160a and 160b. The remaining ends of these coils are connected together by means of a lead 180 that passes through holes 165a and 165b and 141 in the centers of the bobbins 164a and 164b and the center of the flapper 110.

The other terminals 173 and 174 are connected by conductor strips 183 and 184 to the upper and lower capacitor plates 144a and 144b that are on the upper and lower surfaces 110a and 110b respectively of the flapper. As will be seen hereinafter, the upper and lower magnet structures 30a and 30b are electrically connected together forming a common capacitor terminal 30 (See FIG. 4). It is to be noted that the conductor strips 181, 182, 183, and 184 extend from the support ring 140 across the flexure arms 131 and 132 to the flapper 110.

The two coil terminals 171 and 172 are electrically connnected by means of flexible leads 176 and 177 to connector pins 186 and 187 which project downwardly through a hole 166 in the lower magnet structure. Similarly, the two capacitor terminals 173 and 174 are electrically connected by means of flexible leads 178 and 179 to connector pins 188 and 189 which project downwardly through a hole 167 in the lower magnet structure. The four connector pins are mounted in rigid insulating bushings within the holes 166 and 177, thus being mutually insulated from each other and from the magnet structures 30a and 30b. This facilitates connecting them to an external electrical circuit by means of suitable leads.

The support ring 140, the flapper 110, and the posts 142a and 142b constitute a unitary structure, being formed in part by etching a single fused quartz disc and in part by deposition of gold coatings thereon. The annular space 112 and the hole 141 may be formed partly by drilling and cutting and partly by etching. It is particularly advantageous to employ fused quartz in this structure since it is amorphous and isotropic and its various mechanical properties, such as its Young's modulus, its elastic limit, and its thermal coefficient of expansion are not affected by the etching process.

The posts 142a and 142b may be formed by masking the areas where the posts are to be located and then etching the plate to reduce its thickness elsewhere. For example, starting with a plate having a thickness of about 0.030 in., the thickness of the plate, except for the posts, may be reduced to a thickness of about 0.028 in., thus forming posts having a height of about 0.001 in. or less on opposite sides of the plate.

The flexure may then be formed by masking the quartz disc everywhere but at the position of the flexure, and acid etching the disc in the areas where the flexure is to be formed.

Then the plate is masked again, leaving the end surfaces of the posts exposed and also leaving exposed the areas of the plate where terminals 171, 172, 173, and 174 are to be formed and where the electrodes 144a and 144b and the leads 181, 182, 183, and 184 are to be formed. The coatings forming the terminals, the capacitor plates, and the conductor strips are deposited by evaporation. They are very thin, having a thickness much less than that of the height of the posts. In this process, thin discs of gold are also deposited on the outer ends of the posts.

In all cases, where gold is deposited a thin foundation layer of chromium is deposited first to assure establishing a strong bond of the gold to the quartz.

The flexible leads are then applied, the coils mounted, and the electrical connections made to the coils.

The plates 32a and 32b, the pole pieces 34a and 34b, and the proof-mass structure 100 are axially aligned and pressed together with a force of about 1,000 grams while the tabs 200 and the strips 202 are applied. The upper and lower magnet structures 30a and 30b are then assembled and firmly secured together by means of thin steel tabs 200 cemented thereto with conductive cement and by means of thin gold strips 202. An auxiliary connector 185 is welded to the wall of the hole 166 in the lower magnet structure to provide an electrical excitation connector.

The accelerometer unit so formed is then firmly mounted within the housing 20 with the connectors 185, 186, 187, 188, and 189 projecting outwardly through an opening 204 at the base of the housing. In assembling the unit, glue is applied on the outer and inner surfaces of an insulating spacer ring 206 on the accelerometer unit and the various parts pressed together. An annular space 208 formed beneath the lower end of the spacer ring is then filled with epoxy. The housing 20 is then filled with dry nitrogen through a suitable opening 210 which is then sealed with epoxy. The housing 20 is provided with a collar or outwardly extending flange 212 to facilitate securing the accelerometer to an object undergoing test.

In a specific embodiment of the invention, the accelerometer housing had an outside diameter of a little more than 1 inch. The outside diameter of the accelerometer unit 10 was 0.85 in. The etched plate had a final thickness of about 0.028 in. The posts had heights of about 0.00075 in. The gold coatings had a thickness of about 2,000A or about 8 $\mu$in.

The spring constant of the flexure was about 1 radian per g. The total mass of the flapper and coils, which form a proof-mass, was about 1 gram. The resonant frequency of the proof-mass and flexure, when not connected to an electrical circuit, was about 0.1 cps and was about 1,200 cps when electrically connected. The resonant frequency when so connected may be made quite high by methods well known in the art.

The gold surfaces at the outer ends of the posts 142a and 142b, because of their malleability, provided a firm fit between the posts and the inner surfaces 40a and 40b of the magnet structures. The use of malleable materials for such contacts prevents warpage, distortion and lack of uniformity of operation that might otherwise arise because of the presence of microscopic irregularities such as burrs in the surface 40a and 40b or even the surfaces on the outer ends of the posts. Such irregularities would otherwise produce stress concentration, which could result in irregular operation especially when the accelerometer is subjected to large accelerations and when subjected to large temperature changes. Other malleable materials may be used such as silver, aluminum, or lead.

The use of posts unitary with the ring 140 makes it unnecessary to employ separate shims. But it will be understood, of course, that the posts could be formed in the surfaces 40a and 40b and the malleable material deposited on the ends of those posts or on the surfaces of the ring 140 opposite such posts. However, the formation of the posts on the quartz member has the advantage of simplicity of manufacture.

The close spacing between the surface of the flapper and the adjacent surfaces, that is, the capacitor gaps, of the magnet structures resulted in air damping. The damping coefficient was about 0.7 to 0.8 of the critical value. For precision purposes the accelerometer units are manufactured to produce a symmetry in the two capacitor gaps of about 7.5 μin. out of 750 μin.

The precise symmetry of the two capacitor gaps results in almost equal air damping on both sides of the flapper. As a result, a static displacement of the flapper from its neutral position because of oscillation of the flapper caused by alternating acceleration, is rendered negligible. In the absence of such symmetry, oscillation of the flapper would result in unequal aerodynamic forces being applied to the flapper on opposite sides thereof, thereby producing a static deflection of the damper. Such symmetry in the air damping on the two sides of the flapper is attained by virtue of the symmetry of the gaps. This symmetry is made possible by virtue of the unitary construction described.

Figure 5:
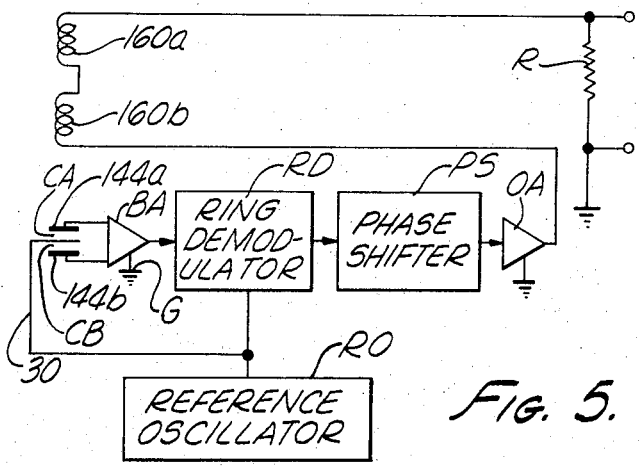
FIG. 5 is a schematic drawing showing a system utilizing the accelerometer of this invention.

A schematic diagram of an electrical system utilizing the accelerometer of this invention is illustrated in FIG. 5. Since the two surfaces 40a and 40b are connected to a common terminal 30, they are electrically depicted in FIG. 5 as one capacitor plate 40 common to both capacitors CA and CB and the movable capacitor plates formed by electrodes 144a and 144b are represented as plates located on opposite sides of a common plate 40 and spaced therefrom.

The two capacitors CA and CB are connected to the opposite sides of a balanced amplifier BA. Alternating current from a reference oscillator RO is applied through terminal 30 and ground G to the capacitor CA and CB. When the accelerometer is subjected to acceleration the capacitance of one capacitor increases and the capacitance in the other capacitor decreases. As a result a signal occurs at the output of the balanced amplifier BA which has an amplitude and phase corresponding to that of the acceleration. This signal is of the suppressed-carrier type. The output of the balanced amplifier and the alternating current signal from the reference oscillator are fed to a ring demodulator RD, thereby producing at the output of the demodulator an alternating current which varies in amplitude and phase in the same manner as the acceleration. This demodulated signal is fed through a phase shifter PS and an output amplifier OA through the coils 160a and 160b and through a load resistor R. A current flowing through the coils 160a and 160b produces alternating magnetic fields which interact with the magnetic field supplied by the magnetic structures 30a and 30b to produce a force on the flapper which counteracts the tendency of the values of capacitance of the two capacitors CA and CB to change value. The signal voltage developed across the resistor R represents the acceleration in amplitude, frequency, and phase. The varying voltage developed across the resistor R varies in proportion to the acceleration. The phase shifter introduces a phase shift that varies with frequency over a range from 0 cps up to a frequency such as 1,200 cps to assure stable servo operation over a wide frequency range that includes the foregoing range. The phase shifter thus compensates for the phase versus frequency characteristics of the accelerometer, the amplifiers and other elements of the circuits. In the servo art such a phase shifter is sometimes known as a compensator. Electrical signals corresponding to components of acceleration outside the latter frequency range may be alternated by suitable filters in the servo system to prevent oscillation at high frequencies, as is well known in the art.

In order to minimize spurious signals that might otherwise arise from vibration of leads connecting the capacitors CA and CB to the amplifier BA, the amplifier is rigidly mounted within the housing at the lower end of the accelerometer unit 10 and the leads to the amplifier BA are formed of rigid metallic conductors. If desired, the ring demodulator RD, the phase shifter PS, the output amplifier OA, the resistor R, and the reference oscillator RO are also mounted with the housing.

It will be understood that the flapper of this invention may be employed in other ways, and that the flapper and the accelerometer may be constructed in other ways. In particular, it will also be understood that the various parts of the flapper may be arranged in other configurations and may be employed in other types of accelerometers such as accelerometers in which the stator members are non-magnetic. It is therefore to be understood that the invention is not limited to the specific device described but may be embodied in many other forms and may be employed in many other ways within the scope of the appended claims.

Other types of materials may be employed in the construction of an accelerometer in accordance with this invention. Likewise, different configurations of the elements and positioning of the posts may be employed. It is, therefore, to be understood that the invention is not limited to the specific device disclosed but may be embodied in many other forms within the scope of the appended claims.

The invention claimed is:

1. An accelerometer for detecting the acceleration of an object to which it is attached, comprising:
    a stator structure having first and second stator members with opposed surfaces aligned along the sensitive axis of the accelerometer;
    an annular support member between the opposed surfaces of the stator structure and extending around said axis;
    at least three spacer means between the support member and each of the opposed surfaces of the stator structure, one of said spacer means lying on the opposite side of the center of said support member from at least two other of said spacer means, the free angular spacing between said spacer means, about the center of said support member, being larger than the sum of the angular widths of said spacer means about said center;
    a flapper flexurally suspended from and inside the annular support member, between said opposed stator surfaces, for movement in response to acceleration along said axis; and
    a pair of capacitors, each capacitor having one plate on the flapper and another plate on the facing surface of the adjacent stator member.

2. The accelerometer of claim 1 in which said spacer means are posts extending axially of the accelerometer from said support member, each post having a contact face coated with malleable metal in engagement with the opposed surfaces of the stator members.

3. The accelerometer of claim 1 having a support member with two surfaces, and three spacer means on each surface of said support member, equally spaced around the support member, the spacer means on opposite surfaces of the support member being aligned.

4. The accelerometer of claim 1 in which said spacer means are posts having an angular width about the center of said support member of at least 5° and less than 15°.

5. The accelerometer of claim 1 in which said annular support member, flapper and spacer means are unitary.

6. The accelerometer of claim 5 in which said unitary support member, flapper and spacer means are of fused quartz.

7. The accelerometer of claim 1 in which said flapper is attached to said support member by a flexure and one of said spacer means lies on a diameter of said support member extending through said flexure.

8. The accelerometer of claim 7 having a support member with two surfaces and three spacer means on each surface of and equally spaced around said support member.

* * * * *